United States Patent
Awatani

(10) Patent No.: US 8,836,820 B2
(45) Date of Patent: Sep. 16, 2014

(54) IMAGE CAPTURING APPARATUS HAVING A CONTROL UNIT CONTROLLING SWITCHING UNIT SUCH THAT FIRST IMAGE IS DISPLAYED IN CASE A PREDETERMINED MOTION IS DETECTED AND A COMPOSITE IMAGE IS DISPLAYED IN CASE MOTION IS NOT DETECTED, CONTROL METHOD THEREOF, AND STORAGE MEDIUM

(75) Inventor: Yoshio Awatani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/454,425

(22) Filed: Apr. 24, 2012

(65) Prior Publication Data

US 2012/0287309 A1 Nov. 15, 2012

(30) Foreign Application Priority Data

May 10, 2011 (JP) ................. 2011-105655

(51) Int. Cl.
*H04N 5/262* (2006.01)
*H04N 5/235* (2006.01)

(52) U.S. Cl.
CPC .................. *H04N 5/2355* (2013.01)
USPC ..................... 348/239; 348/333.01

(58) Field of Classification Search
USPC ............ 348/239, 333.12, 578–601; 386/280; 352/85–91 S
See application file for complete search history.

(56) References Cited

U.S. PATENT DOCUMENTS 7,646,414 B2 * 1/2010 Koseki et al. ............ 348/333.01

FOREIGN PATENT DOCUMENTS

JP 2009-088927 4/2009

* cited by examiner

*Primary Examiner* — Twyler Haskins
*Assistant Examiner* — Angel L Garces-Rivera
(74) *Attorney, Agent, or Firm* — Cowan, Liebowitz & Latman, P.C.

(57) ABSTRACT

An image capturing apparatus, comprises an image capturing unit configured to capture an image of an object; a switching unit configured to switch a display unit so that either a first image captured in a first exposure time or a composite image composed of a second image captured in a second exposure time shorter than the first exposure time is displayed; a detection unit configured to detect motion of the apparatus; and a control unit configured to control the switching unit so that the first image is displayed in a case where a predetermined motion has been detected by the detection unit and the composite image is displayed in a case where the predetermined motion is not detected.

13 Claims, 4 Drawing Sheets

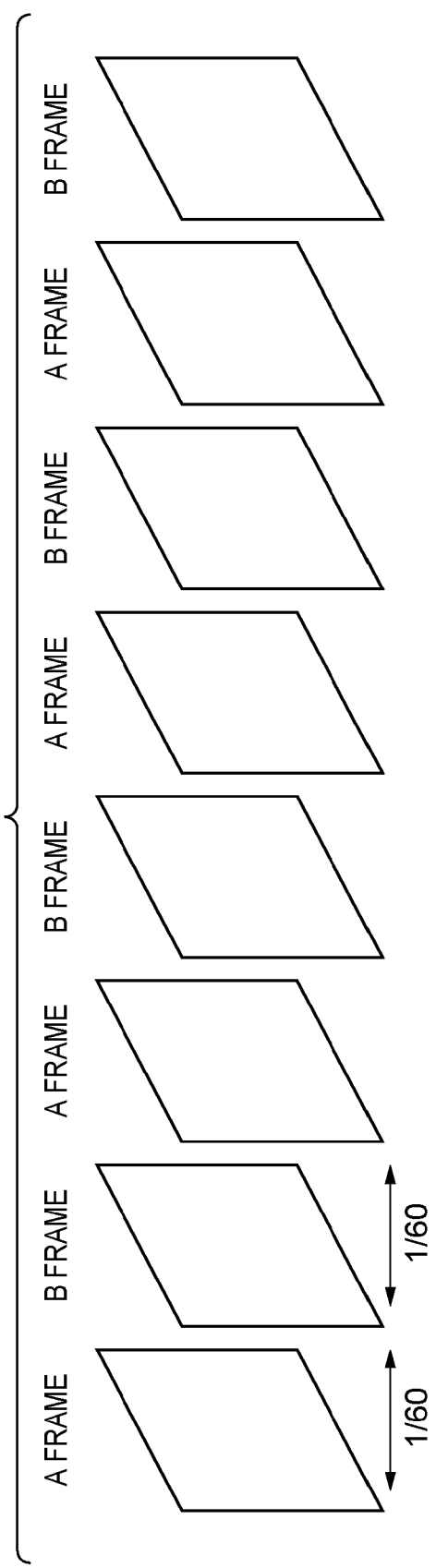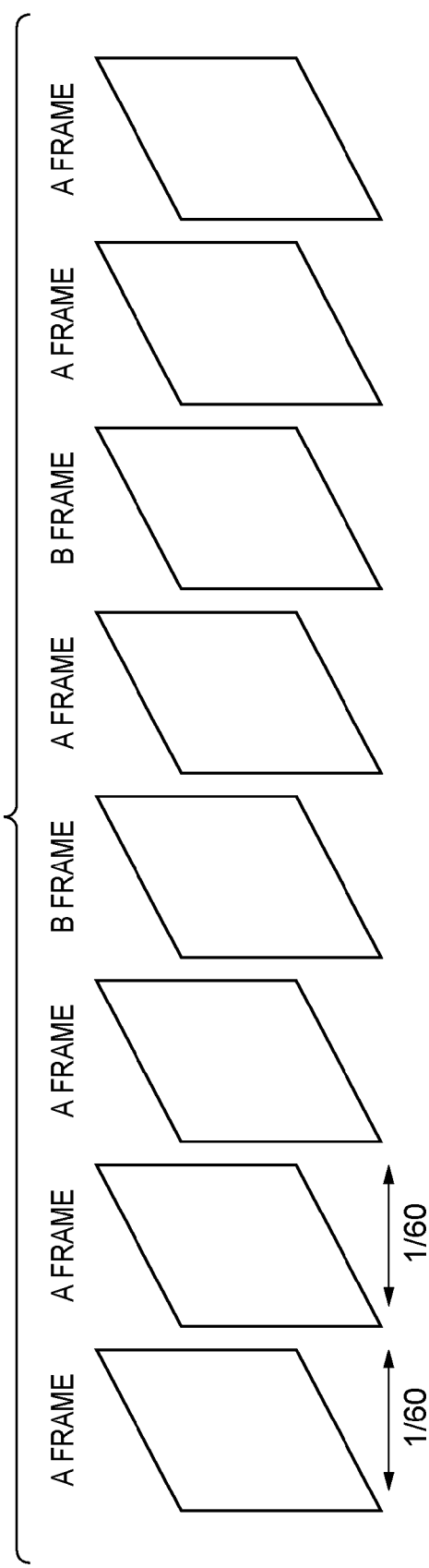

IMAGE CAPTURING APPARATUS HAVING A CONTROL UNIT CONTROLLING SWITCHING UNIT SUCH THAT FIRST IMAGE IS DISPLAYED IN CASE A PREDETERMINED MOTION IS DETECTED AND A COMPOSITE IMAGE IS DISPLAYED IN CASE MOTION IS NOT DETECTED, CONTROL METHOD THEREOF, AND STORAGE MEDIUM

BACKGROUND OF THE INVENTION

1. Field of the Invention

The present invention relates to a control technique of an image capturing apparatus that switches so that a live image or a composite image composed of images, each of which has a short exposure time, is displayed.

2. Description of the Related Art

In recent years, image capturing apparatuses such as digital cameras have been proposed that generate a single composite image composed of multiple images and provide this to the user. A first object of generating a composite image is for expanding the dynamic range. In other words, this is because by varying the exposure while capturing multiple images and composing images having different exposures, it is possible to generate an image having little highlight-detail loss (overexposure) and shadow-detail loss (underexposure) and a wide dynamic range. A second object is greater high-sensitivity. This is because by composing multiple images, the (random) noise component contained in the image is suppressed and the SN ratio of the composite image can be improved.

A point of caution when generating the above-mentioned composite image is that, depending on the object and capture conditions, the composite image can engender a visual sense of strangeness (unnaturalness). Furthermore, in composing the images it is necessary to compose after correcting positional shifting produced between the multiple images, but sometimes this positional shifting cannot be corrected sufficiently depending on the object or the capture conditions such that a blurred image is generated. In this way, sometimes the composite image is undesirably different from the image intended by the user.

For example, Japanese Patent Laid-Open No. 2009-088927 has optimal internal settings for a normal shooting mode (not performing image composing) and a composite image mode, and provides optimal image quality with these modes.

However, optimal settings do not necessarily match the user's preferences and in this case the user will be required to experiment twice with the normal shooting mode and with composite image shooting. Or embodiments are conceivable in which, depending on the product, shooting is performed automatically with the normal shooting mode and image composing with a one-time shutter release, thereby allowing the user to select afterward.

Either way, since the composite image cannot be confirmed until after shooting (after shutter release), it will be desirable for the user to be able to easily confirm the composite image on the display unit prior to actual shooting.

However, problems occur also in cases where the composite image is always displayed prior to shooting. For example, as shown in FIG. 3, with composite images during panning or zooming, depending on the conditions, sometimes a portion of the composite image will become dark or blurred. Accordingly, since zooming and panning often occurs while the user adjusts the composition or angle of view prior to shooting, displaying a single image without displaying a composite image is better for the tracking characteristics of the displayed image for motion and is preferable for the purpose of adjusting the composition and the angle of view.

On the other hand, after the user has finished panning or zooming and immediately prior to shooting, it is preferable to display the composite image so as to enable a finished composite image to be confirmed prior to shooting.

SUMMARY OF THE INVENTION

The present invention has been made in consideration of the aforementioned problems, and realizes a control technology capable of avoiding risks of shooting failures by performing switching so that a single image or a composite image is displayed in response to motion or operations of the camera prior to shooting.

In order to solve the aforementioned problems, the present invention provides an image capturing apparatus, comprising: an image capturing unit configured to capture an image of an object; a switching unit configured to switch a display unit so that either a first image captured in a first exposure time or a composite image composed of a second image captured in a second exposure time shorter than the first exposure time is displayed; a detection unit configured to detect motion of the apparatus; and a control unit configured to control the switching unit so that the first image is displayed in a case where a predetermined motion has been detected by the detection unit and the composite image is displayed in a case where the predetermined motion is not detected.

In order to solve the aforementioned problems, the present invention provides a control method of an image capturing apparatus which has an image capturing unit configured to capture an image of an object; and a detection unit configured to detect motion of the apparatus, the method comprising: a switching step of switching a display unit so that either a first image captured in a first exposure time or a composite image composed of a second image captured in a second exposure time shorter than the first exposure time is displayed; and a control step of controlling the switching of the display in the switching step so that the first image is displayed in a case where a predetermined motion has been detected by the detection unit and the composite image is displayed in a case where the predetermined motion is not detected.

According to the present invention, risks of shooting failures can be avoided by performing switching so that a single image or a composite image is displayed in response to motion or operations of the camera prior to shooting.

Further features of the present invention will become apparent from the following description of exemplary embodiments (with reference to the attached drawings).

BRIEF DESCRIPTION OF THE DRAWINGS

FIGS. 4A and 4B are diagrams for describing display switching processing according to modified examples of the present embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

Configuration of Image Capturing Apparatus

Figure 1:
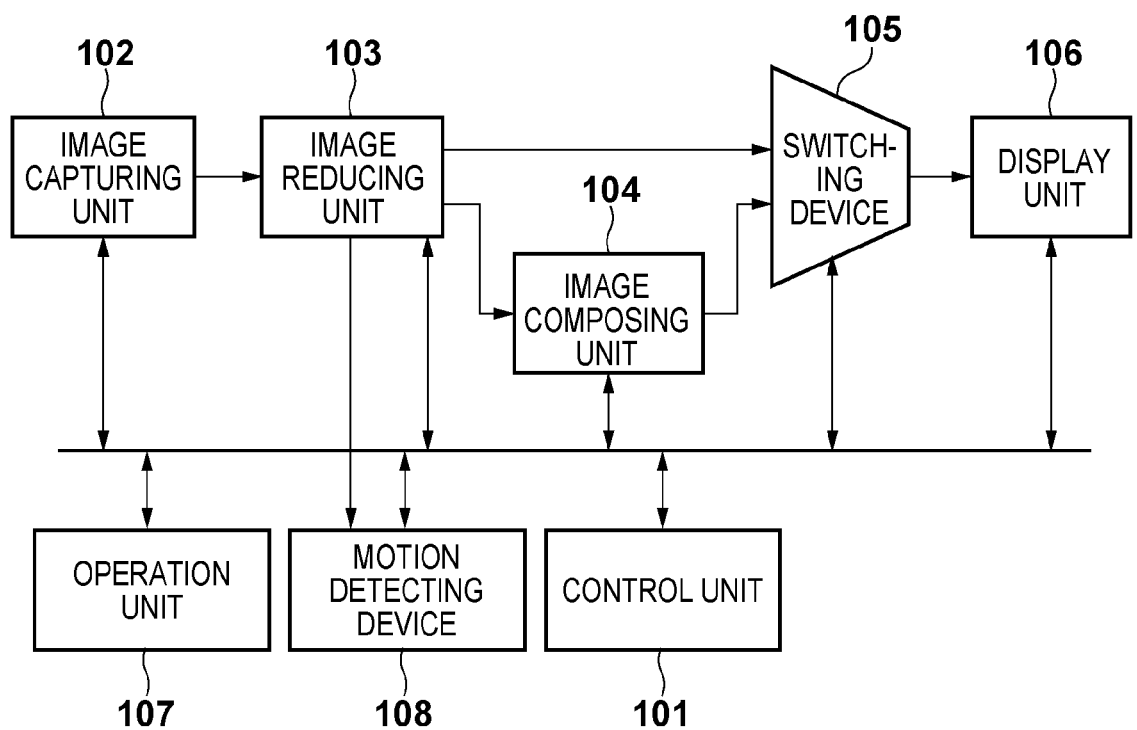
FIG. 1 is a block diagram of an image capturing apparatus according to an embodiment of the present invention.

Description is given with reference to FIG. 1 regarding a configuration of an image capturing apparatus according to an embodiment of the present invention. It should be noted that in the following description an image that is generated by composing multiple images is referred to as a composite image and an image that has been captured is referred to as a single image.

For example, the image capturing apparatus according to the present embodiment is a digital camera having a function of composing one image from multiple images. And in the present embodiment, a display unit is switched in response to a state change of the apparatus so as to display either a first image (single image) captured in a first exposure time (frame) or a composite image composed of a second image captured in a second exposure time shorter than the first exposure time.

In FIG. 1, the image capturing apparatus realizing the present invention mainly includes a control unit 101, an image capturing unit 102, an image reducing unit 103, an image composing unit 104, a switching device 105, a display unit 106, and an operation unit 107, and a motion detecting device 108.

The control unit 101 is a microcomputer for example, and outputs a control signal to each of the above-mentioned units 102 to 108 as well as receiving a signal from each of the units 102 to 108 indicating an operational status and the like.

The operation unit 107 includes a user interface relating to control of the image capturing apparatus represented by operation keys, a touch panel, a zoom button and a shutter button for example. User operations in regard to the image capturing apparatus are inputted to the control unit 101 through the operation unit 107, and actions of each of the units 102 to 108 are determined by receiving a control signal from the control unit 101.

The image capturing unit 102 is a CMOS image sensor for example, and captures images at 60 frames per second for example during normal shooting. Hereinafter, although description is given assuming a frame rate of 1/60 seconds during shooting, the present invention is not limited to this frame rate.

Normally, prior to actual shooting (an operation of actually releasing the shutter), the user views an image on the display unit 106 and carries out settings such as angle of view and exposure. This period is referred to as a pre-shot period.

Based on an electronic shutter function, the image capturing unit 102 can freely vary the exposure time within the 1/60 seconds. Furthermore, the exposure time is variable in frame units. It should be noted that electronic shutter signifies a function that achieves an action equivalent to a shutter release by electronically changing the charge accumulation period after all the charges of the photodiodes of the CMOS image sensor have been cleared out once.

Figure 2:
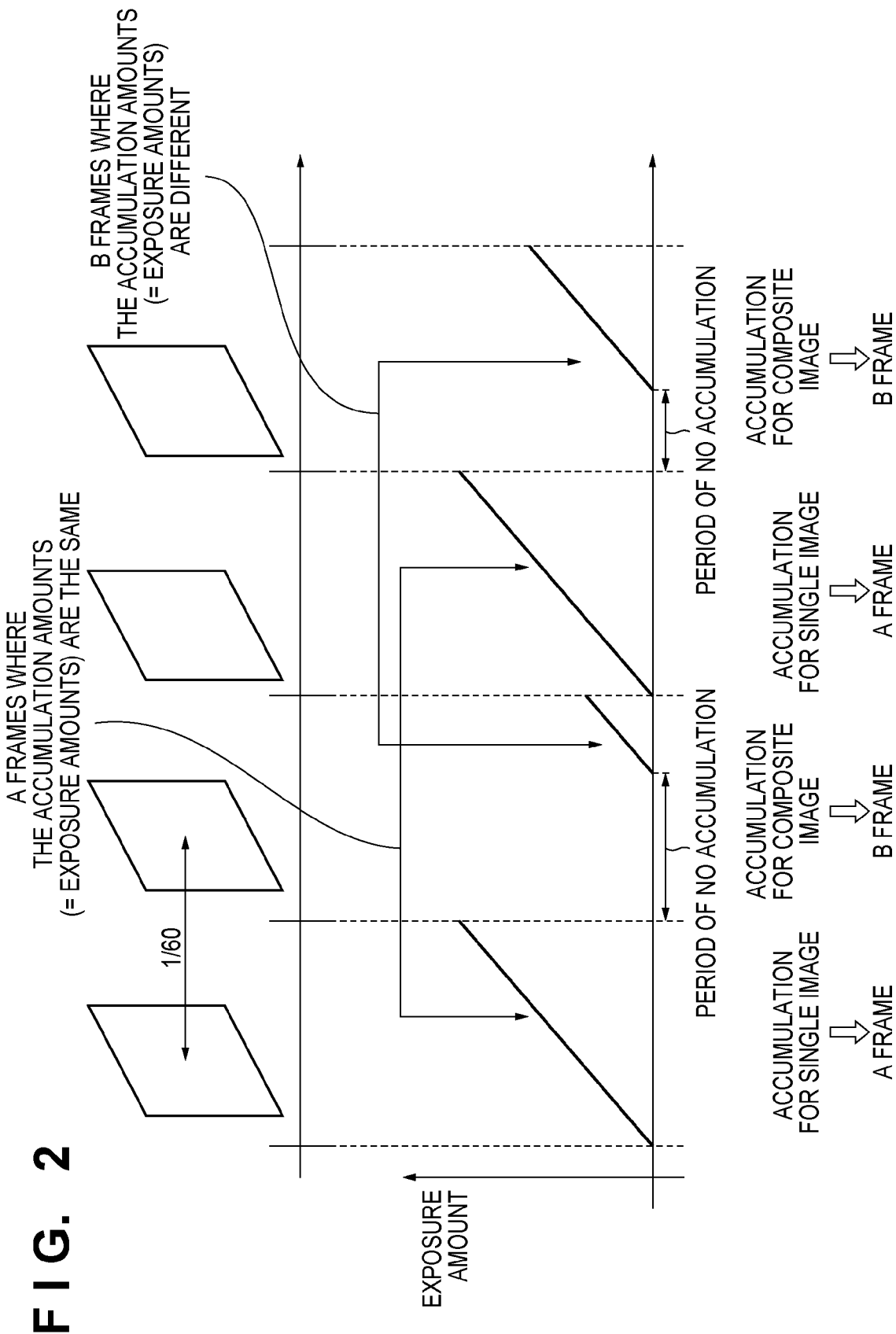
FIG. 2 is a diagram for describing display switching processing of the image capturing apparatus according to the present embodiment.

In the pre-shot period, driving of the image capturing unit 102 is carried out as in FIG. 2 for example.

Given that a maximum 1/60 second charge accumulation is possible in a single frame, in a case viewed using a two frame unit, charge accumulation is carried out for a specific time for one of the frames (an A frame) by driving the image capturing unit 102 as an electronic shutter where the maximum 1/60 second charge accumulation is possible. For the other frame (a B frame), the charge accumulation (exposure amount) is different between frames using the electronic shutter. The amount of charge accumulation for the B frame is determined in response to purposes such as dynamic range expansion and SN ratio improvement in the post-processing of image composing processing.

The A frame is used for finally generating a single image. The B frame is used for finally generating a composite image.

The data size of both the A frame and the B frame is reduced by the image reducing unit 103. This is because the image data obtained from the image capturing unit 102 is extremely large compared to the pixel size of the display unit 106.

After undergoing reduction processing by the image reducing unit 103, the B frame is outputted to the image composing unit 104. The image composing unit 104 composes image data of each frame of the B frame.

The image composing unit 104 is a signal processing circuit having a function that is capable of composing image data of a large number of pixels obtained from the image capturing unit 102 at the time of actual shutter release. It should be noted that since the data amount of the reduced image data from the image reducing unit 103 is small, the processing load required for image composing is not large and also the time required for image composing processing is short. The image data composed of B frame image data by the image composing unit 104 is referred to as a B' frame.

The switching device 105 inputs the A frame from the image reducing unit 103 and the B' frame from the image composing unit 104 and switches the image data of the frame to be outputted to the display unit 106. The control unit 101 determines whether image data of the A frame or the B' frame should be outputted.

For example, the motion detecting device 108 is a sensor that is provided within the image capturing apparatus for detecting angular velocity in three axial directions (X, Y, and Z), and is capable of detecting hand wobbling and panning actions of the shooter. Furthermore, the motion detecting device 108 carries out detection of motion vectors of an object from the reduced image data generated by the image reducing unit 103, and calculates the movement velocity and movement direction of the object and outputs the calculation results to the control unit 101.

The control unit 101 controls the switching device 105 in a following manner.

Figure 3:
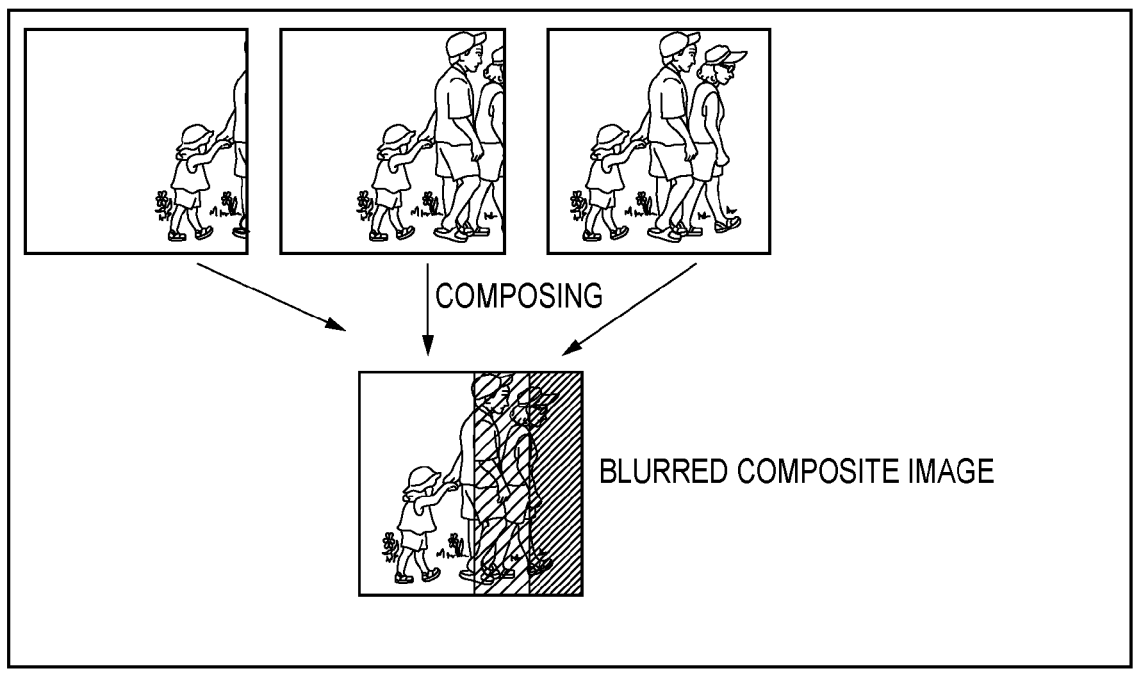
FIG. 3 is a diagram for describing image composing processing.

For example, in a case where the shooter is carrying out a pan or a zoom, the state of the pan can be obtained from the motion detecting device 108 and information of the zoom can be obtained from the operation unit 107. Here, the switching device 105 outputs A frame image data. This is because when composite image data is outputted during panning or zooming, there is a possibility that a portion of the image will become dark or that blur will be generated in the image as shown in FIG. 3.

Furthermore, the switching device 105 outputs A frame image data also in a case where the hand wobbling detected by the motion detecting device 108 is large. This is because when hand wobbling is large there is a possibility that image positional alignment will not be performed well between frames when composing the images and blur will be generated in the composite image.

Furthermore, the switching device 105 outputs A frame image data also in a case where the movement amount of the object detected by the motion detecting device 108 is large. This is because when there is large motion of the object, there is a possibility of a case of a portion of the image becoming dark or that blur will be generated in the image in a same manner as described earlier.

When the above-mentioned zooming, panning, hand wobbling, and object movement amount are within a certain range, the switching device 105 outputs B' frame image data.

By switching the display of images for each frame as described above, the A frame image data is displayed on the display unit 106 when the motion of the object is fast for example when the shooter is zooming or panning. While viewing that image, the user can easily determine the composition and angle of view or the like by carrying out operations relating to shooting.

On the other hand, for situations other than those described above, that is, in situations where the shooting conditions are in order such as a case where zooming and panning have been stopped and the shooter's desired composition and angle of view have been decided or a case where movement of the object has stopped, the B' frame image data is displayed on the display unit 106. Due to this, the user can confirm the composite image before shooting and can avoid situations such as viewing the composite image after shooting and judging it as a failure.

In the foregoing description, the detection result of the motion detecting device 108 is used as a condition for the switching device 105 to output the A frame or the B' frame, but it is also possible to determine a state change of the input signal from the operation unit 107 and to perform switching in response to the result of that determination. Specifically, the operation unit 107 has a shutter button and it is possible that the A frame is always outputted until the user half-presses the shutter button (a predetermined operation), then outputs the B' frame when the shutter button is half-pressed.

Furthermore, a case is also envisaged where the number of capture frames of A frames and B frames in the image capturing unit 102 is variable within a specific time, for example within one second, in response to a detection result of the motion detecting device 108. In a case where A frames are selected with priority as the output of the switching device 105 due to the detection result of the motion detecting device 108, the image capturing unit 102 is controlled so that more A frames are captured compared to B frames. Due to this, the display update rate of A frames increases in the display unit 106 and the tracking characteristics of the display unit 106 are improved with respect to motion of the camera or the object.

FIG. 4A is an example of switching control at normal times and FIG. 4B is an example of switching control in a case where A frames are selected with priority. In FIG. 4B, it is better for the B frames to be not too separated temporally since these are multiple images for composing. This is because not being separated temporally means less positional shifts of the object between images.

Conversely, in a case where B' frames are selected with priority as the output of the switching device 105 due to the detection result of the motion detecting device 108, the image capturing unit 102 is controlled so that more B frames are captured or so that only B frames are captured. Due to this, the display update rate of B frames increases in the display unit 106 and the composite image update rate increases, and thus the tracking characteristics of the display unit 106 are improved with respect to motion of the camera or the object.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-105655, filed May 10, 2011, which is hereby incorporated by reference herein in its entirety.

What is claimed is:

1. An image capturing apparatus, comprising:
an image capturing unit configured to capture an image of an object;
a switching unit configured to switch images displayed on a display unit so that either a first image captured in a first exposure time or a composite image composed of a second image captured in a second exposure time shorter than the first exposure time is displayed;
a detection unit configured to detect motion of the apparatus; and
a control unit configured to control the switching unit so that the first image is displayed in a case where a predetermined motion has been detected by the detection unit and the composite image is displayed in a case where the predetermined motion is not detected,
wherein the control unit control the image capturing unit so that the first image is more captured per unit time in a case where a predetermined motion has been detected by the detection unit than in a case where the predetermined motion has not been detected by the detection unit.

2. The apparatus according to claim 1, further comprising:
an image reducing unit configured to reduce a data size of the first and second images captured by the image capturing unit; and
an image composing unit configured to compose a plurality of the second images reduced by the image reducing unit,
wherein the switching unit switches the display unit so as to display either the first image that has been reduced by the image reducing unit, or the composite image that has been generated by the image composing unit.

3. The apparatus according to claim 2, wherein the control unit controls the switching unit so that the first image is displayed until, instead of motion of the apparatus, a predetermined operation with respect to the apparatus has been detected, and
the composite image is displayed in a case where the predetermined operation has been detected.

4. The apparatus according to claim 2, wherein the control unit controls the switching unit so that the first image is displayed in a case where panning or zooming of the apparatus has been detected as motion of the apparatus, and
the composite image is displayed in a case where panning or zooming of the apparatus has not been detected.

5. The apparatus according to claim 2, wherein the control unit controls the switching unit so that the first image is displayed in a case where wobbling of the apparatus has been detected as motion of the apparatus, and the composite image is displayed in a case where wobbling of the apparatus has not been detected.

6. The apparatus according to claim 1, wherein the control unit controls the image capturing unit in response to motion of the apparatus and sets the first exposure time and the second exposure time as variable.

7. A control method of an image capturing apparatus which has an image capturing unit configured to capture an image of an object; and a detection unit configured to detect motion of the apparatus, the method comprising:

a switching step of switching a display unit so that either a first image captured in a first exposure time or a composite image composed of a second image captured in a second exposure time shorter than the first exposure time is displayed; and a control step of controlling the switching of the display in the switching step so that the first image is displayed in a case where a predetermined motion has been detected by the detection unit and the composite image is displayed in a case where the predetermined motion is not detected, wherein in the control step, the image capturing unit is controlled so that the first image is more captured per unit time in a case where a predetermined motion has been detected by the detection unit than in a case where the predetermined motion has not been detected by the detection unit.

8. The method according to claim 7, further comprising:

an image reducing step of reducing a data size of the first and second images captured by the image capturing unit; and an image composing step of composing a plurality of the second images reduced in the image reducing step, wherein in the switching step, either the first image that has been reduced by the image reducing step, or the composite image that has been generated by the image composing step is displayed by the display unit.

9. The method according to claim 8, wherein in the control step, the switching of the display is controlled so that the first image is displayed until, instead of motion of the apparatus, a predetermined operation with respect to the apparatus has been detected, and the composite image is displayed in a case where the predetermined operation has been detected.

10. The method according to claim 8, wherein in the control step, the switching of the display is controlled so that the first image is displayed in a case where panning or zooming of the apparatus has been detected as motion of the apparatus, and the composite image is displayed in a case where panning or zooming of the apparatus has not been detected.

11. The method according to claim 8, wherein in the control step, the switching of the display is controlled so that the first image is displayed in a case where wobbling of the apparatus has been detected as motion of the apparatus, and the composite image is displayed in a case where wobbling of the apparatus has not been detected.

12. The method according to claim 7, wherein in the control step, the image capturing unit is controlled in response to motion of the apparatus and the first exposure time and the second exposure time are set as variable.

13. A non-transitory computer-readable storage medium storing a program for causing a computer to execute the control method according to claim 7.

* * * * *